United States Patent
Yum (10) Patent No.: US 7,046,932 B2
(45) Date of Patent: May 16, 2006

(54) CHANNEL ALLOCATION APPARATUS OF OSU IN WDM SYSTEM

(75) Inventor: Sang Bok Yum, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 645 days.

(21) Appl. No.: 10/243,646

(22) Filed: Sep. 16, 2002

(65) Prior Publication Data

US 2003/0053168 A1    Mar. 20, 2003

(30) Foreign Application Priority Data

Sep. 17, 2001  (KR) ............................... 2001-57287

(51) Int. Cl.
*H04J 14/00* (2006.01)
(52) U.S. Cl. .......................... 398/51; 398/48
(58) Field of Classification Search ............. 398/48, 398/49, 50, 51, 54
See application file for complete search history.

(56) References Cited

U.S. PATENT DOCUMENTS 5,768,278 A * 6/1998 Virdee et al. ............... 370/468

* cited by examiner

*Primary Examiner*—Christina Y. Leung
(74) *Attorney, Agent, or Firm*—Fleshner & Kim, LLP (57) ABSTRACT

A channel allocation apparatus of an OSU in a WDM system includes: an optical signal converter for performing a conversion operation between an E1 data frame and an optical signal; a channel allocating unit for performing a counting operation by a certain unit on the E1 data, detecting an channel allocated to the E1 data or allocating a channel to the E1 data; an E1 framer for reframing the E1 data frame outputted from the optical signal converter to output it to the channel allocating unit, and framing the E1 data outputted from the channel allocating unit to output it to the optical signal converter; and a microprocessor for controlling an operation of the E1 framer. After the E1 data is counted by a certain unit to sequentially identify a plurality of channels, a channel data is assigned to a corresponding channel or a channel data assigned to the channel is detected.

18 Claims, 6 Drawing Sheets

CHANNEL ALLOCATION APPARATUS OF OSU IN WDM SYSTEM

BACKGROUND OF THE INVENTION

1. Field of the Invention

The present invention relates to a wavelength division multiplexing (WDM) system, and more particularly, to a channel allocation apparatus of an optical supervisory channel unit (OSU) in the WDM system.

2. Description of the Background Art

Figure 1:
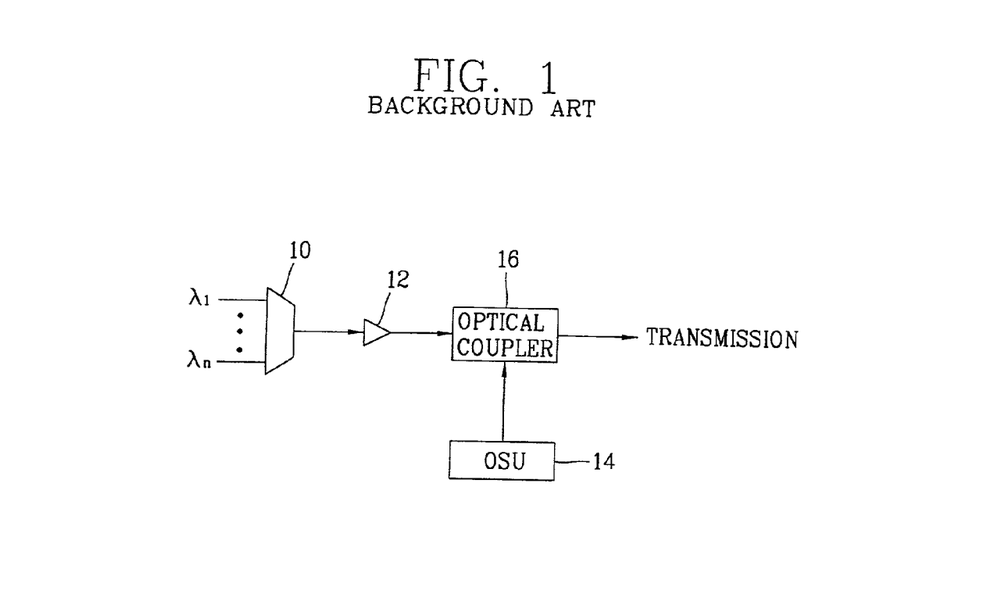
FIG. 1 is a schematic view of a general WDM system.

FIG. 1 is a schematic view of the WDM system.

As shown in FIG. 1, a multiplexer 10 multiplexes a plurality of optical signals each having a different wavelength (λ1, . . . , λn), and an optical amplifier 12 amplifies the multiplexed optical signal to a certain level.

An optical supervisory channel unit (OSU) 14 outputs an optical signal which has assigned a data channel and a voice channel required for managing a network.

An optical coupler 16 couples the optical signals of the optical amplifier 12 and of the OSU 14 and transmits the coupled signal to a destination. These 20 elements constitute an optical transmitting unit.

In general, the OSU provides a data communication and an orderwire (OW) channel between a WDM system-based systems such as a WDM terminal, a repeater or an optical add-drop multiplexer (OADM), and is roughly classified into a structure using an STM-1 (155.520 Mbps) and a structure using an E1 (2.048 Mbps).

Figure 2:
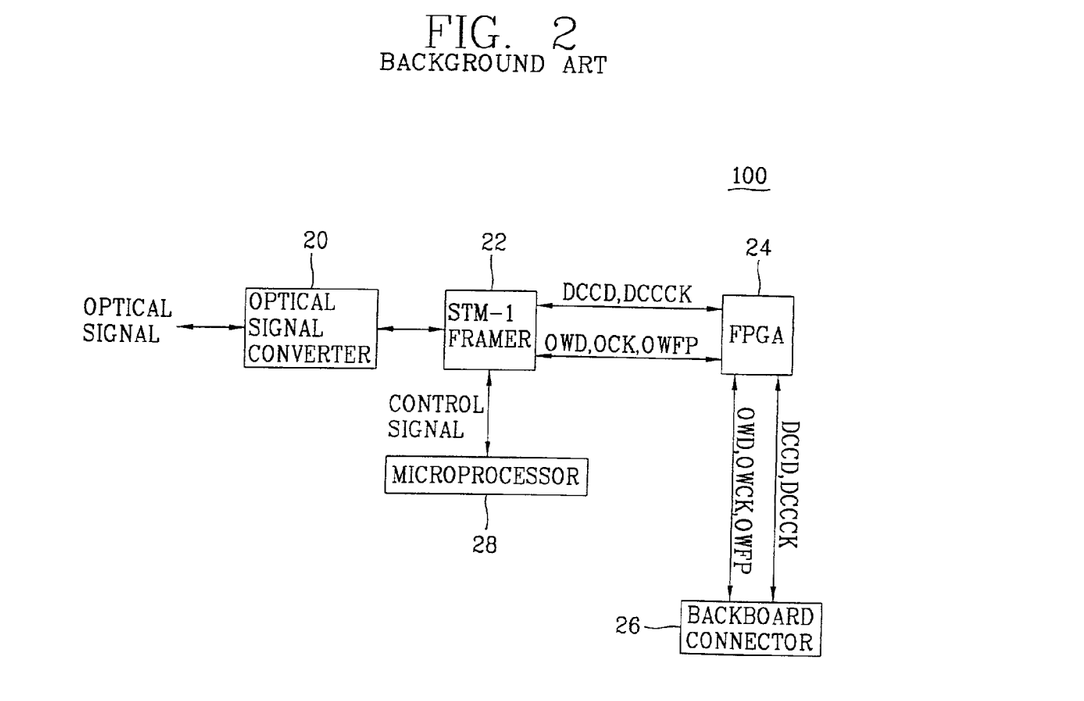
FIG. 2 is a view showing one example of an OSU using an STM-1 of FIG. 1.

FIG. 2 shows an example of a conventional OSU 100 using the STM-1.

As shown in FIG. 2, the OSU 100 includes an optical signal converter 20, an STM-1 framer 22, an FPGA (Field Programmable Gate Array) 24, a backboard connector 26 and a microprocessor 28.

The optical signal converter 20 performs a conversion operation between a STM-1 frame data and an optical signal. The STM-1 framer 22, implemented as an application specific IC (ASIC), allocates/extracts a data communication channel data (DCCD) and an orderwire data (OWD) to/from an overhead of the STM-1 frame data as well as framing/reframing the STM-1.

The FPGA 24 temporarily stores a DCCD, an OWD, a DCC clock signal (DCCCK), an OW clock signal (OWCK) and a frame pulse (OWFP), and the backboard connector 26 connects an external data processing unit (not shown) and the OSU 100.

Figure 3:
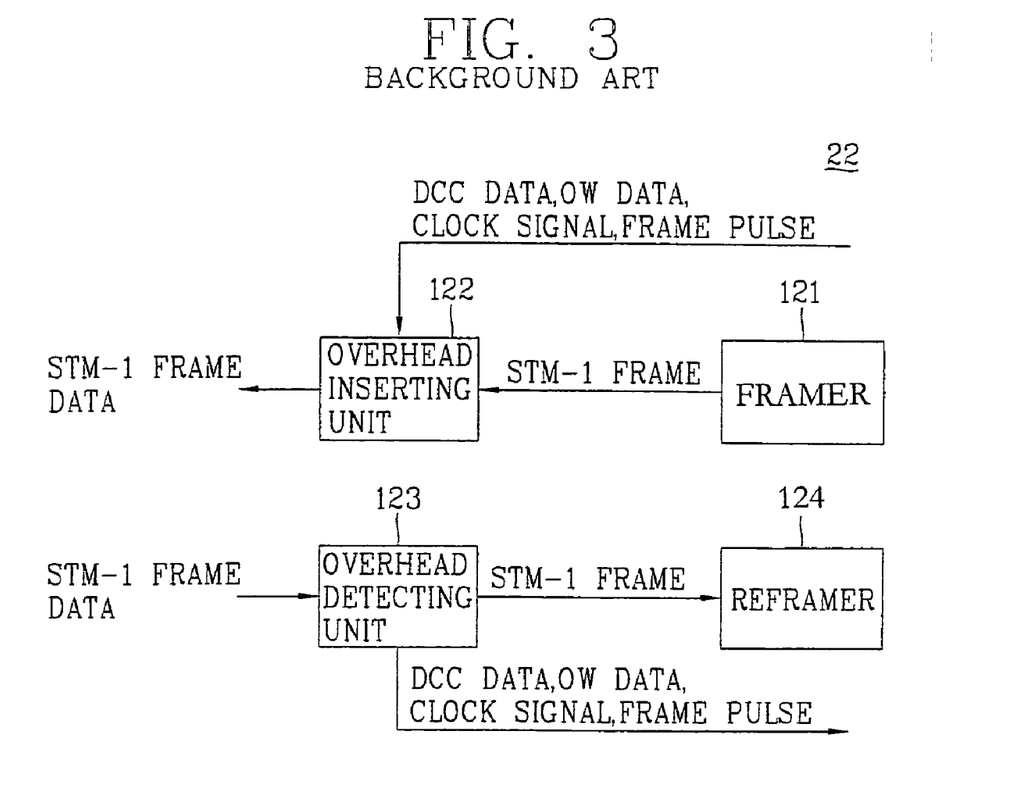
FIG. 3 is a detailed view illustrating the STM-1 framer of FIG. 2.

As shown in FIG. 3, the STM-1 framer 22 consists of a framer 121 forming an STM-1 frame, an overhead inserting unit 122 for inserting an outputted DCCD and OWD outputted from the FPGA 24 into the overhead of the formed STM-1 frame, an overhead detecting unit 123 for extracting the STM-1 frame, the DCCD and the OWD from the received STM-1 frame data, and a reframer 124 for reframing the STM-1 frame extracted from the overhead detecting unit 123.

The operation of the OSU 100 using the conventional STM-1 frame constructed as described above will now be explained.

First, the DCCD, OWD, clock signals (DCCCK, OWCK) and the OWFP inputted from an external data processing unit (not shown) through the backboard connector 26 is stored in the FPGA 24.

After forming the STM-1 frame, the STM-1 framer 22 inserts the DCCD and the OWD into the overhead of the STM-1 frame under the control of the microprocessor.

That is, as shown in FIG. 3, the framer 121 of the STM-1 framer 22 forms an STM frame, and the overhead inserting unit 122 inserts the DCCD and the OWD outputted from the FPGA 24 into the overhead of the STM-1 frame under the control of the microprocessor 28.

Then, the optical signal converter 20 converts the STM-1 frame data outputted from the overhead inverting unit 122 into an optical signal by using a 155 M laser diode (not shown) and outputs the optical signal to the WDM system.

Meanwhile, the optical signal transmitted from the WDM system is converted into an STM-1 frame data by the optical signal converter 20, and the overhead detecting unit 123 of the STM-1 framer 22 detects an overhead of the STM-1 frame data under the control of the microprocessor 28 and outputs the DCCD, the OWD, the clock signal and the OWFP to the FPGA 24, and the STM-1 frame to the reframer 124.

Accordingly, the DCCD, the OWD, the clock signal and the OWFP inputted to the FPGA 24 are outputted to the external data processing unit (not shown) through the backboard connector 26, and the reframer 124 reframes the inputted STM-1 frame.

The OSU using the STM-1 implements the STM-1 framer which frames/reframes the STM-1 signal and extracts/inserts the DCCD and the OWD as the ASIC and interworks with the external data processing unit through the FPGA and the backboard connector.

Figure 4:
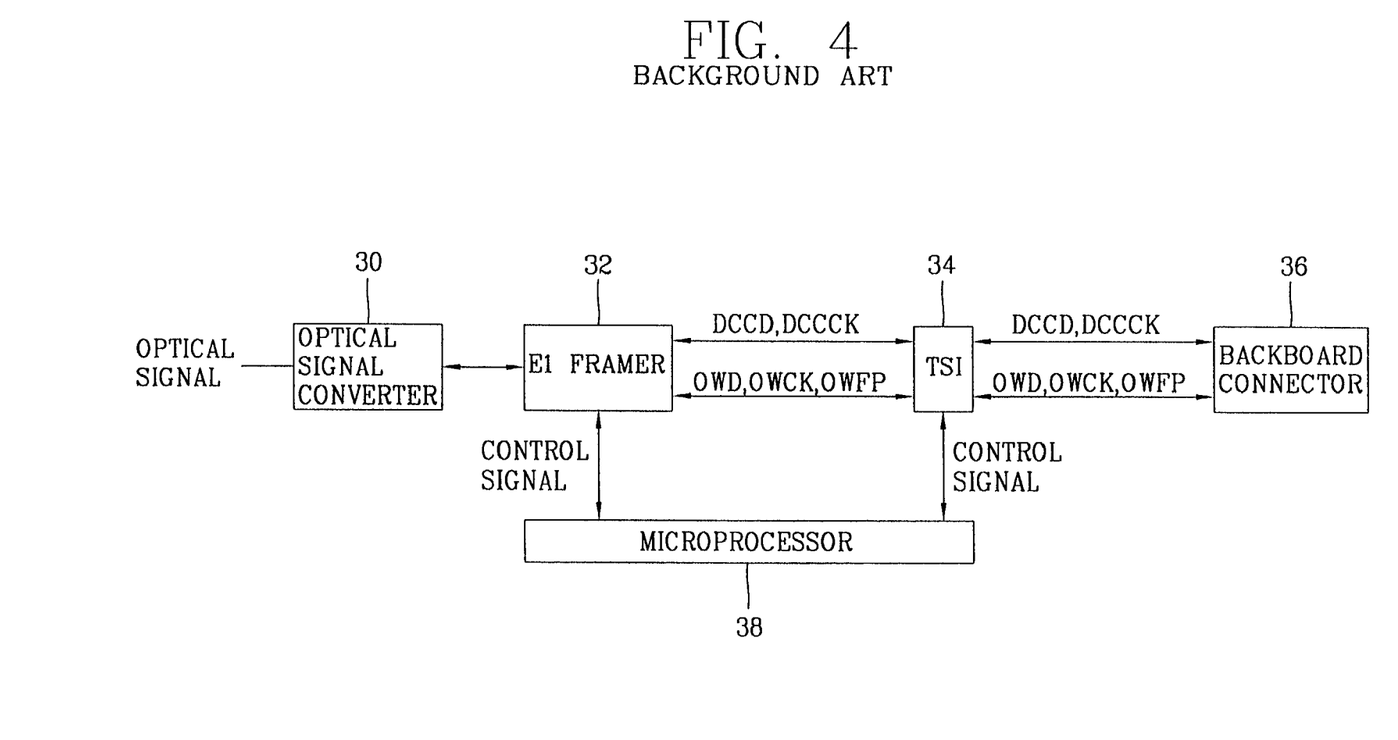
FIG. 4 is a view illustrating one example of an OSU using the E1 of FIG. 1.

FIG. 4 is a conventional OSU 200 using an E1.

As shown in FIG. 4, the conventional OSU 200 using the E1 consists of an optical signal converter 30, an E1 framer 32, a time slot interface (TSI) 34, a backboard connector 36 and a microprocessor 38.

The E1 framer 32 frames an E1 frame data to a time slot data under the control of the microprocessor 38, and the TSI 34 interfaces the time slot data of the E1 framer 32 in a time division multiplexing (TDM) method according to a control signal outputted from the microprocessor 38 and extracts a DCCD and an OWD.

In addition, the TSI 34 interfaces the DCCD and the OWD inputted from an external data processing unit (not shown) through the backboard connector 36 by the TDM method to input them into the time slot data, and outputs them to the E1 framer 32.

In this manner, when the E1 framer 32 and the TSI 34 are used, the E1 framer 32 performs an E1 framing/reframing and the TSI 34 separates a channel, and forms corresponding channels as a serial data according to a use and transmits them to the backboard connector 36.

However, the conventional OSU using the STM-1 uses the STM-1 framer chip and the 155M laser diode for a low rate data, a cost charge is increased. Especially, since the STM-1 framer interworks with the microprocessor, much time is taken for the performance implementation, the board testing, and the like.

In addition, in the OSU using the E1, the commercial chips that generally handle the DS-1E such as the TSI follows a coding method such as an AMI and an HDB3. Accordingly, the commercial chip such as the TSI is not suitable to be used for an optical communication system on the basis of a Manchester code and an NRZ signal in a physical layer, and especially, for the low rate data.

This is resulted from unnecessary functions as well as from a difference in the interface method. If the OSU using the conventional E1 is implemented by using the commercial chip, much time is taken for implementing a function, and operating chips such as a processor are required to designate an address.

The above references are incorporated by reference herein where appropriate for appropriate teachings of additional or alternative details, features and/or technical background.

SUMMARY OF THE INVENTION

Therefore, an object of the present invention is to provide a channel allocation apparatus of an OSU that is capable of allocating and detecting a channel flexibly in a WDM system which operates a network using a low rate such as an E1 class.

Another object of the present invention is to provide a channel allocation apparatus of an OSU that is capable of simplifying a function implementation and being implemented as one chip.

To achieve at least the above objects in whole or in parts, there is provided a channel allocation apparatus of an OSU in a WDM system including: an optical signal converter for performing a conversion operation between an E1 data frame and an optical signal; a channel allocating unit for performing a counting operation by a certain unit on the E1 data, detecting an channel allocated to the E1 data or allocating a channel to the E1 data; an E1 framer for reframing the E1 data frame outputted from the optical signal converter to output it to the channel allocating unit, and framing the E1 data outputted from the channel allocating unit to output it to the optical signal converter; and a microprocessor for controlling an operation of the E1 framer.

To achieve at least these advantages in whole or in parts, there is further provided a channel allocation apparatus of an OSU in a WDM system including: an optical signal converter for performing a conversion operation between an E1 data frame and an optical signal; a demultiplexing unit for counting the E1 data by 8 bit unit, counting it to separate a plurality of channels and detecting a data allocated to the separated channels; a multiplexing unit for counting the E1 data by 8 bit unit to separate it to a plurality of channels, allocating a certain data to the separated channel and forming an E1 data; an E1 framer for reframing the E1 data frame outputted from the optical signal converter to output it to the demultiplexing unit, framing the E1 data outputted from the multiplexing unit to output it to the optical signal converter; and a microprocessor for controlling an operation of the E1 framer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 8 is a view showing an example of a channel allocation of an E1 data.

DETAILED DESCRIPTION OF THE PREFERRED EMBODIMENTS

Figure 5:
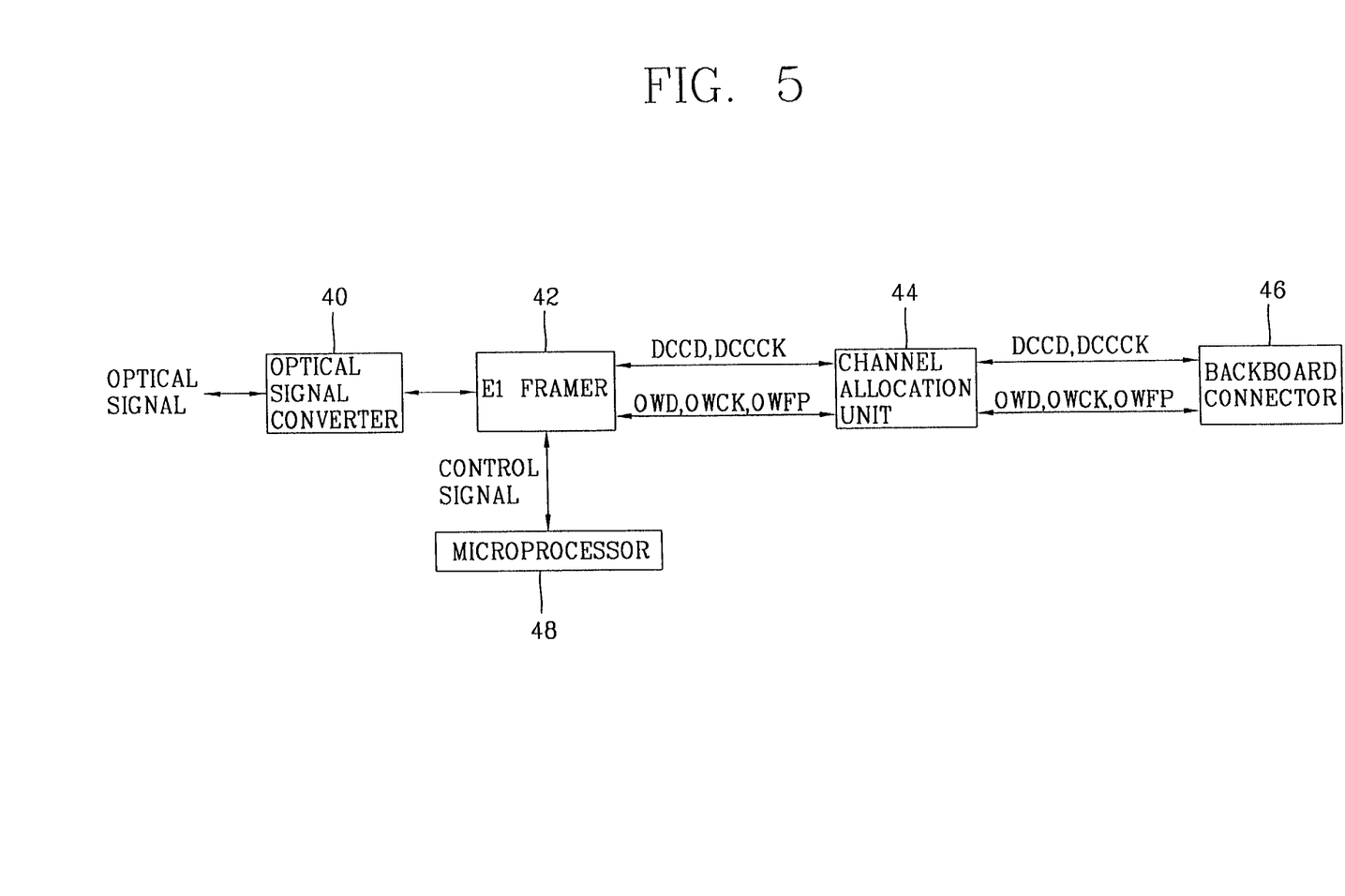
FIG. 5 is a block diagram of a channel allocation apparatus of the OSU in a WDM system in accordance with the present invention.

FIG. 5 is a block diagram of a channel allocation apparatus of the OSU in a WDM system in accordance with the present invention.

As shown in FIG. 5, the OSU of the present invention includes an optical signal converter 40, an E1 framer 42, a channel allocation unit 44, a backboard connector 46 and a microprocessor 48.

The channel allocation unit 44 extracts a DCC data (DCCD), an OW data (OWD), clock signals (DCCCK, OWCK) and a frame pulse (OWFP) from the E1 data outputted from the E1 framer 42, and allocates the DCCD, the OWD, the clock signal and the OWFP outputted from the backboard connector 46 to the E1 data.

Figure 6:
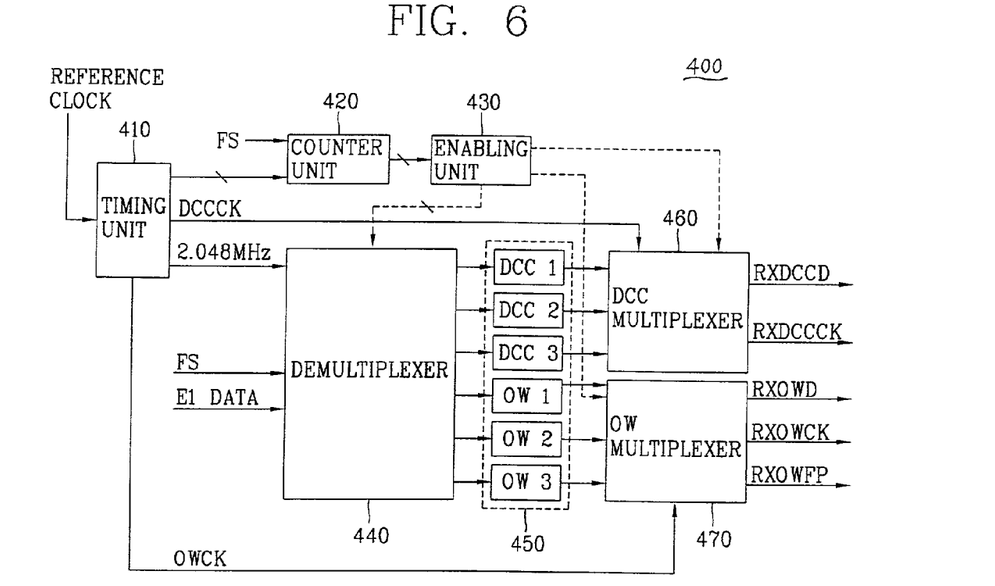
FIG. 6 is a detail view illustrating a demultiplexing unit provided in the channel allocation apparatus of FIG. 5.
Figure 7:
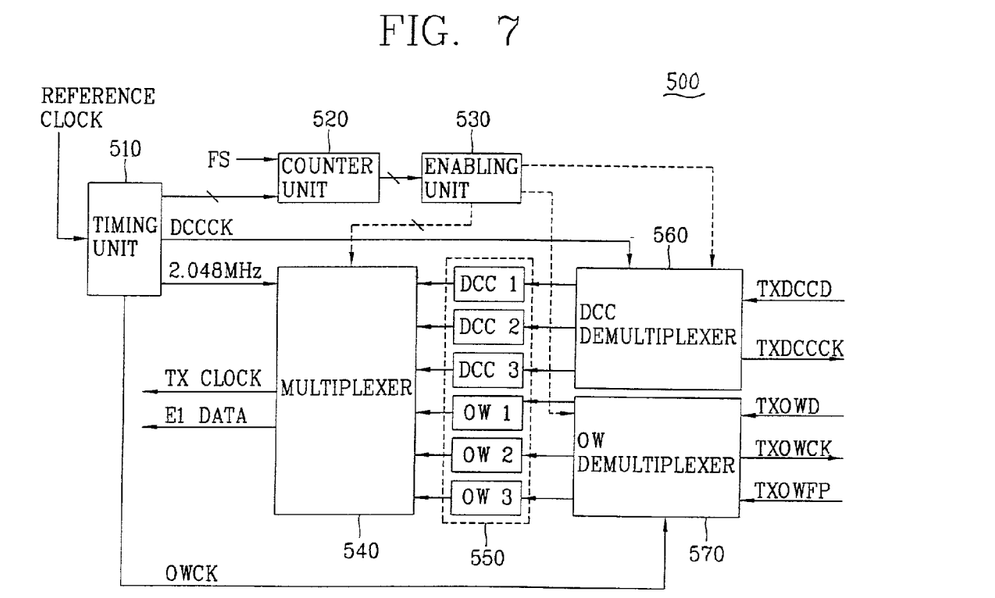
FIG. 7 is a detailed view illustrating a multiplexing unit provided in the channel allocation apparatus of FIG. 5.

FIGS. 6 and 7 are view illustrating detailed constructions of a demultiplexing unit 400 and a multiplexer (500) of the channel allocation unit 44.

As shown in FIG. 6, the demultiplexing unit 400 includes a timing unit 410 for dividing a reference clock and outputting a DCC clock signal (DCCCK), an OW clock signal (OWCK) and a 2.048 MHz clock signal; a counter unit 420 for counting the clock signal (2.048 MHz) according to a frame start (FS) signal and outputting a count value of 0~255; an enabling unit 430 for generating an enable signal in each channel of the E1 frame according to a count value of the counter unit 420; a demultiplexer 440 activated by an enable signal outputted from the enabling unit 430, demultiplexing the E1 data according to the frame start signal (FS) and detecting an DCCD and an OWD; a buffer unit 450 for storing the DCCD and the OWD detected by the demultiplexer 440; a DCC multiplexer 460 and an OW multiplexer 470 each activated by an enable signal outputted from the enabling unit 430, multiplexing the DCCD and the OWD stored in the buffer unit 450, and outputting a receiving DCC data (RXDCCD), a receiving OW data (RXOWD), a receiving clock signal (RXDCCCK, RXOWCK) and a receiving frame pulse (RXOWFP).

As shown in FIG. 7, the multiplexing unit 500 is constructed symmetrical to the demultiplexing unit 400, detailed descriptions of which are omitted.

The operation of the OSU of the system in accordance with the present invention constructed as described above will now be explained with reference to the accompanying drawings.

The optical signal transmitted from the WDM system is converted into an E1 frame in the optical signal converter 40, and the E1 framer 42 reframes the E1 frame under the control of the microprocessor 48 and outputs the E1 data to the channel allocation unit 44.

The channel allocation unit 44 performs a 8-bit unit counting operation on the E1 data to detect the channel data (DCCD and OWD) allocated to each channel and outputs the channel together with the clock signals (DCCCK and OWCK) and the frame pulse (OWFP) to the backboard connector 46.

That is, as shown in FIG. 8, the E1 data includes a total of 32 channels (time slots) by taking 8 bits as one channel, and a data region is assigned to 30 channels except for '0' and '16'.

Accordingly, the DCC data region is assigned by using the consecutive DCC data channel. For example, N-DCC1~N-DCC4 are assigned to DCC1, NDCC5~N-DCC8 to DCC2, and N-DCC9~N-DCC12 to DCC3.

Since the OW data channel is discontinuous, each channel is assigned as the OW data region. In this respect, the DCC data rate is a 768 Kbps, and the OW data rate is a 192 Kbps.

The timing unit 410 divides the reference clock and outputs the DCCCK, the OWCK and the 2.048 MHz clock signal, and the counter unit 420 counts the entire channels of the E1 frame. At this time, the counter 420 counts the clock signal (2.048 MHz) according to the frame start signal (FS) and outputs count values of 0~255.

The enabling unit 430 receives the count value and generates a high level enable signal when the count value corresponding to a channel-allocated bit is inputted. and the demultiplexer 440 is activated by the enable signal, demultiplexes the inputted E1 data and detects a channel data allocated to each channel.

In other words, the demultiplexer 440 is operated by the high level enable signal, extracts the DCCD and the OWD from the E1 data inputted with the start of the FS signal and outputs them to the buffer unit 450. At this time, the buffer unit 450, a device for conforming the data rate, includes three buffers (DCC1~DCC3) for storing the DCC data and the buffers (OW1~OW3) for storing the OW data.

Accordingly, the DCC multiplexer 460 and the OW multiplexer 470 are operated by the enable signal outputted from the enabling unit 430 and multiplex the DCCD stored in the buffer 450 according to the DCCCK and the OWCK outputted from the timing unit 410.

That is, as shown in FIG. 8, the E1 data includes a total of 32 channels (time slots) by taking 8 bits as one channel, and a data region is assigned to 30 channels except for '0' and '16'.

That is, since the enable unit 430 outputs the high level enable signal when the channel-allocated bit is inputted, at the time when each buffer (DCC 1~DCC3 and OW1~0W3) of the buffer unit 450 is filled, the DCC multiplexer 460 multiplexes the DCCD stored in the buffer 450 according to the DCCCK and outputs the receiving DCC data (RXCDDC) and the receiving clock signal (RXCDDDK), and the OW multiplexer 470 multiplexes the OWD stored in the buffer 450 according to the OWCK and outputs the receiving OW data (RXOWD), the receiving clock signal (RXOWCK) and the receiving clock signal (RXOWFP) to the backboard connector 46.

Meanwhile, the channel allocation unit 44 performs a 8-bit unit counting operation on the E1 data to allocate the channel data (DCCD and OWD) to each channel and output it to the E1 framer 42, and the E1 framer 42 frames the E1 data outputted from the channel allocation unit 44 and outputs the E1 frame to the optical signal converter 40 under the control of the microprocessor 48. Then, the optical signal converter 40 optical-signal converts the E1 frame outputted from the E1 framer 42 and outputs it to the WDM system.

That is, as shown in FIG. 7, the timing unit 510 divides the reference clock and outputs the DCCCK, the OWCK and the 2.048 MHz clock signal, and the counter unit 520 counts the clock signal (2.048 MHz) according to the frame start signal (FS) and outputs a count value of 0~255.

The enabling unit 530 receives the count value and generates a high level enable signal when the count value of the bit to which a channel is to be allocated, is inputted.

At this time, the DCC demultiplexer 560 and the DCC clock (TXDCCK) are transmitted to the backboard connector 46 to read a transmitting DCC data (TXDCCD), and the OW demultiplexer 570 transmits a transmitting OW clock (TXOWCK) to the backboard connector 46 to read a transmitting OW data (TXOWD) by taking a transmitting frame pulse (TXOWFP) as a start signal.

When the data is read, the DCC demultiplexer 560 and the OW demultiplexer 570 respectively output the TXDCCD and TXOWD to the buffer unit 55 according to the enable signal, and the mutliplexer 540 multiplexes the DCC data (DCC1~DCC3) and the OW data (OW1~OW3) stored in the buffer unit 55 whenever the enable signal becomes a high level, to form the E1 data and outputs the E1 data together with the 2.048 transmitting clock (TX CLOCK).

As so far described, the channel allocation apparatus of an OSU in a WDM system of the present invention has the following advantages.

That is, for example, since the DCC data and the OW data are allocated to and extracted from the E1 frame by using a simple block, the channel can be flexibly allocated and detected in the WDM system which operates a network using a low rate such as the E1 class.

In addition, a development term of the OSU can be shortened by simplifying the channel allocation block, and especially, the function suitable to a system is easily implemented and a fabrication cost can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A channel allocation apparatus of an OSU in a WDM system comprising:
    an optical signal converter for performing a conversion operation between an E1 data frame and an optical signal;
    a channel allocating unit for performing a counting operation by a certain unit on E1 data and detecting an channel allocated to the E1 data, the channel allocating unit including a demultiplexing unit to detect data assigned to each channel, the demultiplexing unit including:
        a demultiplexer to demultiplex the E1 data and detect the data assigned to each channel;
        a buffer unit to store the detected channel data; and
        a channel data multiplexer to multiplex the channel data stored in the buffer unit and to output the multiplexed channel data;
    an E1 framer for refraining the E1 data frame outputted from the optical signal converter to output it to the channel allocating unit, and framing the E1 data outputted from the channel allocating unit to output it to the optical signal converter; and
    a microprocessor for controlling an operation of the E1 framer.

2. The apparatus of claim 1, wherein the certain unit is an 8 bit.

3. The apparatus of claim 1, wherein the channel allocation unit
further includes a multiplexing unit for counting the E1 data by 8 bit units to separate a plurality of channels and assigning a certain data to the separated channel to form an E1 data.

4. The apparatus of claim 3, wherein the multiplexing unit comprises:
a counter unit for counting the entire channels of the E1 frame;
an enabling unit for generating an enable signal in each channel according to a countvalue of the counter unit;
a channel data demultiplexer activated by the enable signal and demultiplexing a channel data;
a buffer unit for storing the demultiplexed channel data; and
a multiplexer activated by the enable signal, multiplexing the channel data stored in the buffer unit and assigning the channel data to the E1 data.

5. The apparatus of claim 4, wherein the channel data comprises a data communication channel (DCC) data and an orderwire (OW) data.

6. The apparatus of claim 1, wherein the demultiplexing unit further includes:
a counter unit for counting the entire channels of the E1 frame; and
an enabling unit for generating an enable signal in each channel according to a count value of the counter unit, wherein the demultiplexer is activated by the enable signal,
and the channel data multiplexer is activated by the enable signal, the channel data multiplexer outputting the multiplexed channel data to an external data processing unit.

7. The apparatus of claim 1, wherein the channel data comprises a data communication channel (DCC) data and an orderwire (OW) data.

8. A channel allocation apparatus of an OSU in a WDM system comprising:
an optical signal converter for performing a conversion operation between an E1 data frame and an optical signal;
a demultiplexing unit for counting the E1 data by 8 bit units, counting it to separate a plurality of channels and detecting a data allocated to the separated channels, the demultiplexing unit to detect data assigned to each channel, the demultiplexing unit including:
a demultiplexer to demultiplex the E1 data and detect the data assigned to each channel,
a buffer unit to store the detected channel data, and
a channel data multiplexer to multiplex the channel data stored in the buffer unit and to output the multiplexed channel data;
a multiplexing unit for counting the E1 data by 8 bit units to separate it to a plurality of channels, allocating a certain data to the separated channel and forming an E1 data;
an E1 framer for refraining the E1 data frame outputted from the optical signal converter to output it to the demultiplexing unit, framing the E1 data outputted from the multiplexing unit to output it to the optical signal converter; and
a microprocessor for controlling an operation of the E1 framer.

9. The apparatus of claim 8, wherein the demultiplexing unit further includes:
a counter unit for counting the entire channels of the E1 frame; and
an enabling unit for generating an enable signal in each channel according to a count value of the counter unit, wherein the demultiplexer is activated by the enable signal,
and the channel data multiplexer is activated by the enable signal, the channel data multiplexer outputting the channel to an external data processing unit.

10. The apparatus of claim 9, wherein the channel data comprises a data communication channel (DCC) data and an orderwire (OW) data.

11. The apparatus of claim 8, wherein the multiplexing unit comprises:
a counter unit for counting the entire channels of the E1 frame;
an enabling unit for generating an enable signal in each channel according to a count value of the counter unit;
a channel data demultiplexer activated by the enable signal and demultiplexing a channel data;
a buffer unit for storing the demultiplexed channel data; and
a multiplexer activated by the enable signal, multiplexing the channel data stored in the buffer unit and assigning the channel data to the E1 data.

12. The apparatus of claim 11, wherein the channel data comprises a data communication channel (DCC) data and an orderwire (OW) data.

13. A channel allocation apparatus of an OSU in a WDM system comprising:
an optical signal converter for performing a conversion operation between an E1 data frame and an optical signal;
a channel allocating unit for performing a counting operation by a certain unit on E1 data and allocating a channel to the E1 data, the channel allocating unit including a multiplexing unit to allocate data to the E1 data, the multiplexing unit including:
a channel data demultiplexer to demultiplex channel data,
a buffer unit to store the demultiplexed channel data, and
a multiplexer to multiplex the channel data stored in the buffer unit and assign the channel data to the E1 data;
an E1 framer for framing the E1 data outputted from the channel allocating unit to output it to the optical signal converter; and
a microprocessor for controlling the E1 framer.

14. The apparatus of claim 13, wherein the multiplexing unit further includes:
a counter unit to count channels of the E1 data frame; and
an enabling unit to generate an enable signal for each channel according to a count value of the counter unit, wherein the channel data demultiplexer is activated by the enable signal and the multiplexer is activated by the enable signal.

15. The apparatus of claim 13, wherein the channel data comprises data communication channel (DCC) data and orderwire (OW) data.

16. A channel allocation apparatus of an OSU in a WDM system comprising:
an optical signal converter to convert between an E1 data frame and an optical signal;

a demultiplexing unit to count E1 data by 8 bit units, counting it to separate a plurality of channels and detect a data allocated to the separated channels;

a multiplexing unit to count the E1 data by 8 bit units to separate it to a plurality of channels, allocating a certain data to the separated channel and forming an E1 data, the multiplexing unit including:
- a channel data demultiplexer to demultiplex channel data;
- a buffer unit to store the demultiplexed channel data; and
- a multiplexer to multiplex the channel data stored in the buffer unit and assign the channel data to the E1 data;

an E1 framer to frame the E1 data outputted from the multiplexing unit to output it to the optical signal converter; and a microprocessor for controlling an operation of the E1 framer.

17. The apparatus of claim 16, wherein the multiplexing unit further includes:
- a counter unit to count channels of the E1 data frame; and
- an enabling unit to generate an enable signal in each channel according to the count value of the counter unit, wherein the channel data demultiplexer is activated by the enable signal and the multiplexer is activated by the enable signal.

18. The apparatus of claim 16, wherein the channel data compromises a data communication channel (DCC) data and an orderwire (OW) data.

* * * * *